(12) United States Patent
Neugebauer et al.

(10) Patent No.: US 12,707,982 B2
(45) Date of Patent: Aug. 11, 2026

(54) JITTER APPLIED DETECTION FOR SEMICONDUCTOR SECURE ELEMENT

(71) Applicant: NXP B.V., Eindhoven (NL)

(72) Inventors: Kurt Ulrich Neugebauer, Vaterstetten (DE); Nicolas Louis Bernard Nabor Hemmerle, Munich (DE); Devesh Pratap Singh, Bijnor (IN); Younes Benlakhouy, Grasbrunn (DE)

(73) Assignee: NXP B.V., Eindhoven (NL)

( * ) Notice: Subject to any disclaimer, the term of this patent is extended or adjusted under 35 U.S.C. 154(b) by 64 days.

(21) Appl. No.: 18/973,783

(22) Filed: Dec. 9, 2024

(65) Prior Publication Data

US 2025/0201736 A1 Jun. 19, 2025

(30) Foreign Application Priority Data

Dec. 19, 2023 (IN) ............................. 202341087023

(51) Int. Cl.
*G06F 21/55* (2013.01)
*G01R 31/317* (2006.01)
*G06F 21/76* (2013.01)
*H10W 42/40* (2026.01)

(52) U.S. Cl.
CPC .......... *H10W 42/405* (2026.01); *G06F 21/55* (2013.01); *G06F 21/76* (2013.01)

(58) Field of Classification Search
None
See application file for complete search history.

(56) References Cited

U.S. PATENT DOCUMENTS

| | | | | |
|---|---|---|---|---|
| 10,256,199 | B2 * | 4/2019 | Elenes | H03G 3/3036 |
| 11,366,898 | B2 | 6/2022 | Sonntag et al. | |
| 2018/0235242 | A1 * | 8/2018 | Meier | A21C 7/005 |
| 2020/0043868 | A1 | 2/2020 | Apte et al. | |
| 2021/0150027 | A1 * | 5/2021 | Sonntag | G06F 21/556 |

FOREIGN PATENT DOCUMENTS

| | | |
|---|---|---|
| CN | 105391542 B | 1/2019 |

OTHER PUBLICATIONS

Deshpande, et al.: "Employing Dual-complementary Flip-Flops to Detect EMFI Attacks", IEEE, 2017 Asian Hardware Oriented Security and Trust Symposium (AsianHOST), DOI: 10.1109/AsianHOST.2017.8354004, Beijing, China, Oct. 19-20, 2017, pp. 109-114.

Gujar: Detecting Electromagnetic Injection Attack on FPGAs Using In Situ Timing Sensors, Master Thesis, Virginia Tech, Blacksburg, Virginia, Jul. 30, 2018, pp. 1-110.

(Continued)

*Primary Examiner* — Anh Q Tran

(57) ABSTRACT

A method for jitter applied detection for a semiconductor secure element including generating a test waveform comprising a test pulse. The test waveform is modulated with an inductive loop coupled to a secure element and to an Electromagnetic (EM) signal to generate an observed waveform comprising an observed pulse, wherein the secure element comprises a flip-flop. A temporal change is measured between the test pulse and the observed pulse and the temporal change is compared to a reference to determine an Electromagnetic-Fault-Injection (EMFI) event.

20 Claims, 5 Drawing Sheets

(56) References Cited

OTHER PUBLICATIONS

Paquette, et al.: "Visualizing Electromagnetic Fault Injection With Timing Sensors", IEEE, 2021 IEEE Physical Assurance and Inspection of Electronics (PAINE), DOI: 10.1109/PAINE54418.2021.9707696, Washington, DC, USA, Nov. 30, 2021-Dec. 2, 2021, pp. 1-8.

Breier, et al.: "An Electromagnetic Fault Injection Sensor using Hogge Phase-Detector," IEEE, 2017 18th International Symposium on Quality Electronic Design (ISQED), Mar. 14-15, 2017, DOI: 10.1109/ISQED.2017.7918333, Santa Clara, CA, USA, pp. 1-6.

* cited by examiner

JITTER APPLIED DETECTION FOR SEMICONDUCTOR SECURE ELEMENT

CROSS-REFERENCE TO RELATED APPLICATIONS

This application claims the priority under 35 U.S.C. § 119 of India application Ser. No. 20/234,1087023, filed on 19 Dec. 2023, the contents of which are incorporated by reference herein.

FIELD

This disclosure relates generally to electronic circuits, and more specifically to the detection of Electromagnetic-Fault-Injection (EMFI) attacks on secure semiconductor circuit elements.

BACKGROUND

EMFI attacks are advantageous for an attacker because physical attacks can be performed on an integrated circuit in-situ. In most cases, desoldering a component is not required and only access to the circuit side of the component is required. An EMFI attack couples Electromagnetic (EM) energy into power and ground loops of a circuit to induce timing violations in a specific location proximal to the EM source, which may be exploited to bypass security measures of the circuit or to simply force an operating failure.

EMFI induced failures are not well represented by traditional timing fault models. Rather, the failure mechanism is more aptly represented by a sampling fault model. Early detection of an induced failure is important to retain secure data. In addition, the EMFI detection mechanism should be sensitive to low EM levels yet robust to avoid false error reporting due to power supply variations and other intrinsic noise sources.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for the early detection of EMFI attacks by detecting disturbances (e.g. a jitter or glitch) of a known good pulse compared to one that is subject to external EM interference. A test pulse may be applied to a circuit comprising a sampling device such as a flip-flop or other edge sensitive storage element. In one embodiment, the circuit comprises a secure element that may compromise the security of a system if accessed by an attacker. An attacker may attempt to interfere with the proper sampling of the sampling device by using an external EM probe to generate an EM signal that will couple into the sampling device by way of power and ground loops connected thereto. In one example, the improper sampling will cause setup or hold violations, thereby resulting in the sampling device latching an earlier or later data value.

Such coupling and interference to the normal operation of the secure element may be detected by use of the test pulse applied to the same element and by observing any disturbances to the test pulse from the EM signal. In one embodiment, the coupling into the secure element occurs through unbalanced or asymmetric coupling into a power loop and a ground loop. Each of the power and ground loops may generate a back Electromotive Force (EMF), which results in voltage distortions that do not cancel each other, thereby causing sampling issues with storage elements.

The embodiments described in this disclosure may be applied to any pulse-based logic system that stores the results of combinatorial logic in an edge sensitive storage element, including but not limited to automotive, medical, security and industrial applications. Effective detection of EMFI events is provided with a small footprint (in both area and current consumption), is fast and sensitive to attacks with a low false error rate. Furthermore, the disclosed embodiments are tolerant of power supply noise, device manufacturing and environmental variations and aging effects.

Figure 1:
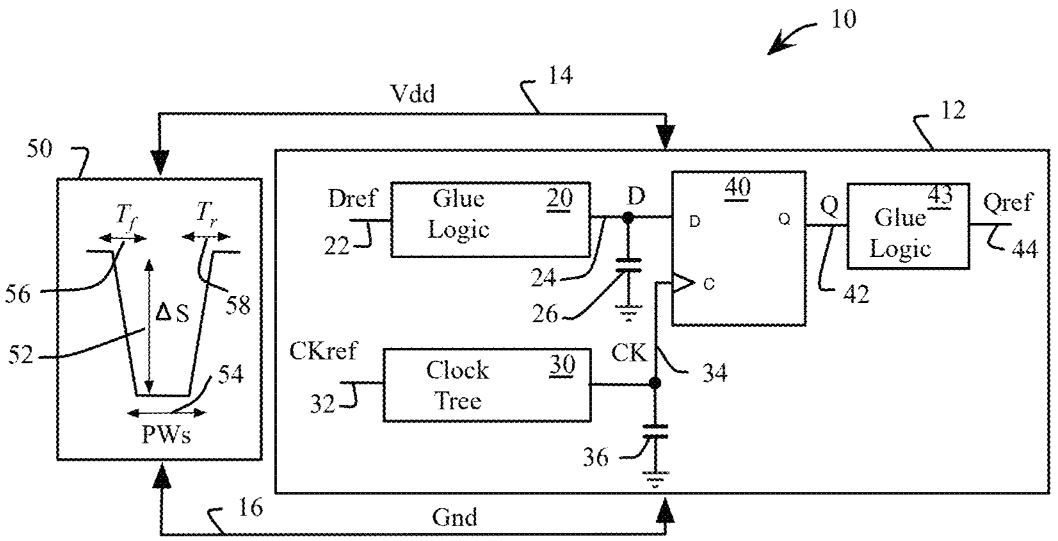
FIG. 1 is a schematic view of an embodiment of a circuit subject to an EMFI attack.

FIG. 1 shows an embodiment 10 of a circuit subject to an EMFI attack. The embodiment 10 includes a system 12 powered between a power supply 14 and a ground 16. The system 12 includes glue logic 20 (e.g., a logic path of combinatorial gates) to receive data Dref 22 and generate data D 24 held on a grounded capacitor 26. The system 12 also includes a clock tree 30 to receive a reference clock CKref 32 and generate a clock CK 34 held on a grounded capacitor 36. In the absence of perturbations caused by EM, a flip-flop 40 copies the data D 24 to an output Q 42, where the output Q42 further propagates through glue logic 43 to generate a reference output Qref 44.

Figure 2:
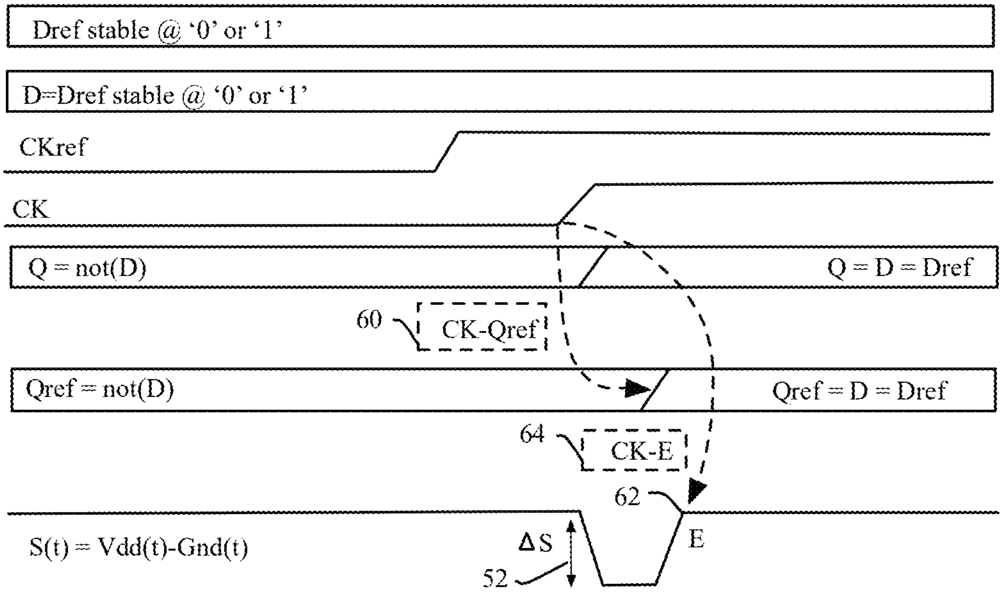
FIG. 2 is a graphical view of timing signals from the embodiment of FIG. 1.

In the presence of an EMFI attack, a perturbation 50 may interfere with the proper latching of the data D 24 by the clock CK 34. In one example, the perturbation is caused by an EM pulse, applied externally to the system 12. The EM pulse may generate unbalanced EMF on the power supply 14 and ground 16, resulting in an undershoot having a magnitude 52 and pulse width 54, and with a falling edge duration Tf 56 and a rising edge duration Tr 58. The resulting effect on the embodiment 10 of FIG. 1 is shown in the timing diagrams of FIG. 2. Specifically, in the absence of an EMFI attack, the delay between the clock CK 34 and reference output Qref 44 is shown as CK-Qref 60. During the timing frame when the perturbation is active, extending up to the end E 62 of the perturbation, the sampling operation of the flip-flop 40 may be compromised, specifically during the CK-E 64 interval.

Figure 3:
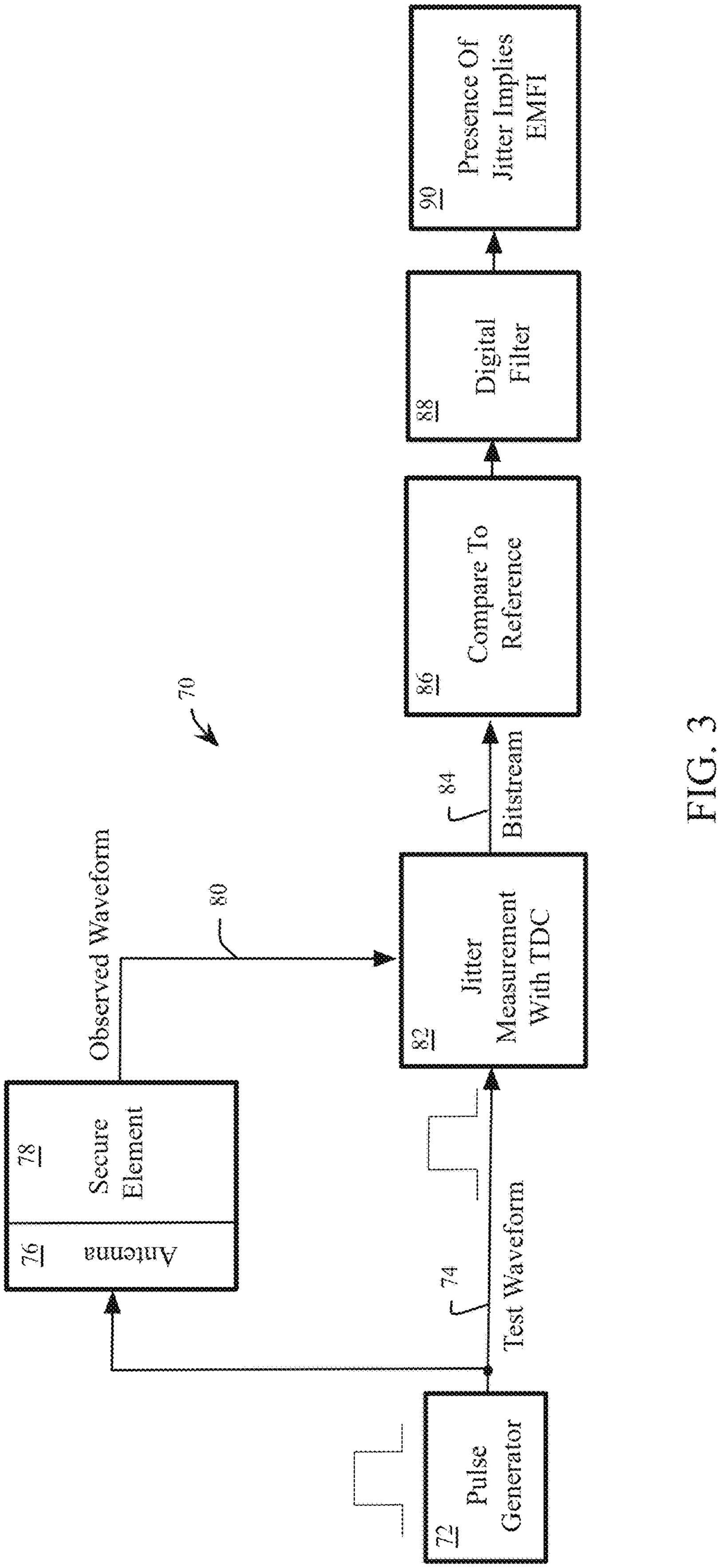
FIG. 3 is a schematic view of a system for jitter applied detection for semiconductor secure element, in accordance with an embodiment of the present disclosure.

FIG. 3 shows a system 70 for jitter applied detection for semiconductor secure element, according to an embodiment of the present disclosure. The system 70 includes a pulse generator 72 configured to generate a test waveform 74 having at least one test pulse. The test waveform 74 is received by an antenna 76 coupled to a secure element 78.

In one embodiment, the antenna 76 may be a combination of one or more of power network and a ground network. In another embodiment, the antenna 76 includes an additional antenna coupled to one of the power network and the ground network. The secure element 78 includes a sampling device, such as a flip-flop or other edge sensitive storage device.

During an EMFI event, an observed waveform 80 generated by the secure element 78 may include a temporal change and is received by a jitter measurement circuit 82. In one embodiment, the jitter measurement circuit 82 is implemented with a Time to Digital Converter (TDC) to generate a bitstream 84. In one embodiment, the jitter measurement circuit 82 measures the pulse width of the test waveform 74 and the observed waveform 80 separately and then calculates the difference between two. Variation in this difference represents the amount of disturbance introduced in observed waveform 80. In another embodiment, the jitter measurement circuit 82 measures the time difference between edges of the observed waveform 80 with respect to edges of test waveform 74 sequentially. Variation in measured time difference represents the amount of disturbance introduced in observed waveform 80. A comparator circuit 86 compares the difference measured to a preset reference value. When the difference measured exceeds the reference value, it is determined that an EMFI event has occurred and appropriate action may be taken (e.g., blocking access to hardware or software, or setting a flag).

In another embodiment, the jitter measurement circuit 82 sequentially measures pulse width of the observed waveform 80 and compares this measured pulse width to a reference with the comparator circuit 86, where the reference defines an acceptable pulse width range. When the measured pulse width crosses outside the range defined by the reference, then an EMFI event will be determined to have occurred.

In another embodiment, the EMFI event may cause the observed waveform 80 to have a glitch. In this case, the jitter measurement circuit 82 may determine a jitter value by measuring the time elapsed between one edge of the observed waveform 80 and the glitch. In another embodiment, the jitter value may be determined by measuring an elapsed time between both edges of the observed waveform 80 and the glitch, then choosing then comparing one or both of the elapsed times against the reference in the comparator circuit 86.

In one embodiment, a digital filter 88 may be used to further narrow the conditions upon which an EMFI event is determined. A response circuit 90 may also be used to determine subsequent actions when an EMFI event is determined.

Figure 4:
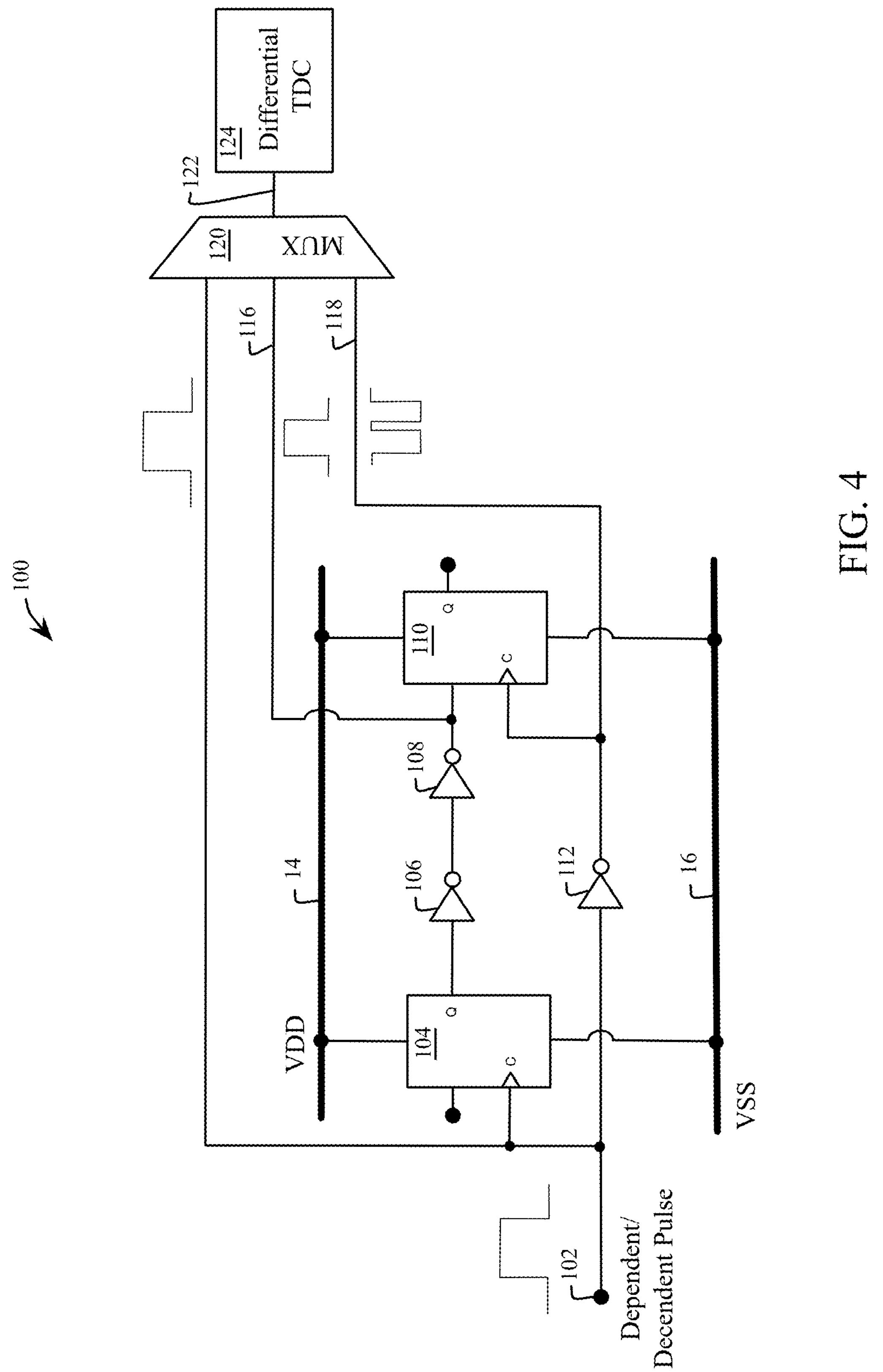
FIG. 4 is a schematic view of a circuit subject to an EMFI attack with observation points for jitter applied detection, in accordance with an embodiment of the present disclosure.

FIG. 4 shows an embodiment 100 of a circuit with observation points for jitter applied detection, according to an embodiment of the present disclosure. The circuit 100 includes a dependent pulse 102, which may be generated by the pulse generator 72 of FIG. 3. The dependent pulse 102 may clock a flip-flop 104 to transfer a data through inverters 106 and 108 to generate a pulse 116. In other embodiments, the inverters 106 and 108 can be replaced by other combinational logic circuits. The dependent pulse 102 may also be used to clock a flip-flip 110 after being inverted by an inverter 112 to generate a pulse 118. During an EMFI attack, the inverters 106, 108 and 112 each may couple EM through their respective power and ground loops, thereby changing the shape of the dependent pulse 102 by introducing jitter or a glitch. The circuitry of FIG. 3 may be shared by using a multiplexor (MUX) 120 to generate an interlaced signal 122 from 102, 116 and 118. In one embodiment, the signal 122 may subsequently be measured with a differential TDC 124, similar to the jitter measurement circuit 82 of FIG. 3. The embodiment 100 of FIG. 4 may be extended to multiplex and observe any number of signals that may be affected by an EMFI attack.

Figure 5:
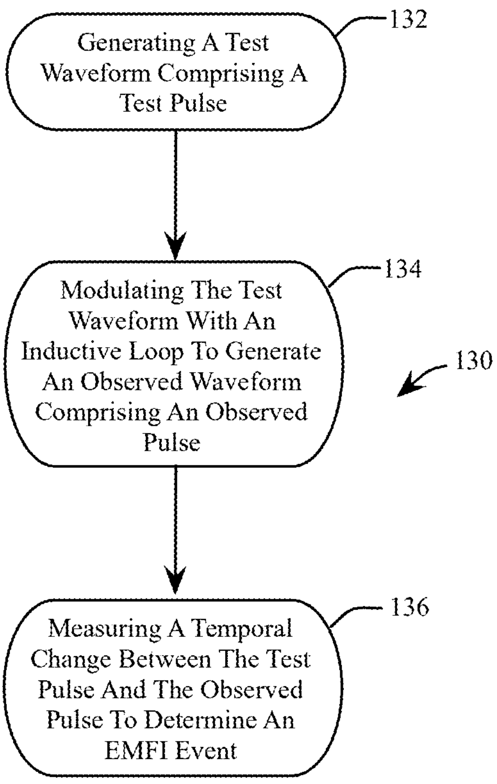
FIG. 5 is a flowchart representation of a method for jitter applied detection for semiconductor secure element, in accordance with an embodiment of the present disclosure.

FIG. 5 shows an embodiment 130 of a method for jitter applied detection for semiconductor secure element. With reference to FIG. 3 and FIG. 5, at 132 a test waveform 74 comprising a test pulse is generated. At 134, the test waveform is modulated with an inductive loop (e.g., antenna 76) to generate an observed waveform 80 comprising an observed pulse. At 136, a temporal change (e.g., a jitter or glitch), between the test pulse and the observed pulse is measured to determine an EMFI event.

Figure 6:
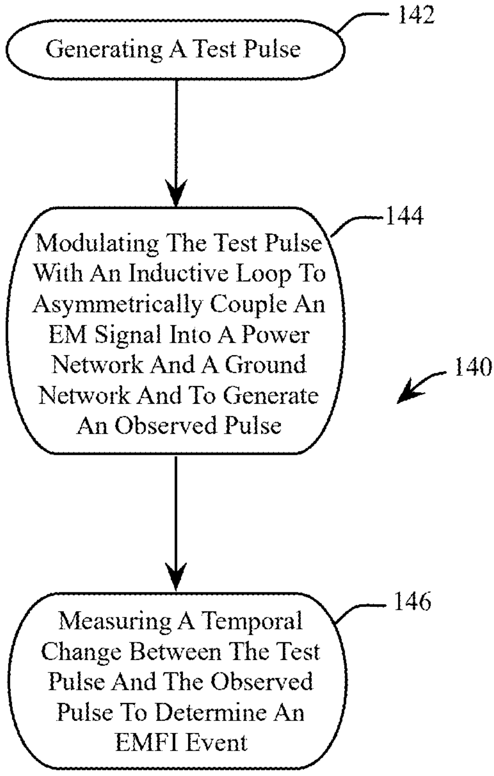
FIG. 6 is a flowchart representation of another method for jitter applied detection for semiconductor secure element, in accordance with an embodiment of the present disclosure.

FIG. 6 shows an embodiment 140 of a method for jitter applied detection for semiconductor secure element. With reference to FIG. 3 and FIG. 6, at 142 a test pulse is generated. At 144, the test pulse is modulated with an inductive loop to asymmetrically couple an EM signal into a power network and a ground network and to generate an observed pulse. At 146, a temporal change (e.g., a jitter or glitch), is measured between the test pulse and the observed pulse to determine an EMFI event.

As will be appreciated, at least some of the embodiments as disclosed include at least the following. In one embodiment, a method for jitter applied detection for a semiconductor secure element comprises generating a test waveform comprising a test pulse. The test waveform is modulated with an inductive loop coupled to a secure element and to an Electromagnetic (EM) signal to generate an observed waveform comprising an observed pulse, wherein the secure element comprises a flip-flop. A temporal change between the test pulse and the observed pulse is measured and the temporal change is compared to a reference to determine an Electromagnetic-Fault-Injection (EMFI) event.

Alternative embodiments of the method for jitter applied detection for a semiconductor secure element include one of the following features, or any combination thereof. Modulating with the inductive loop comprises altering a timing of a signal of the secure element and wherein the inductive loop comprises at least one of a power network and a ground network. The EM signal couples into the power network by a different amount than into the ground network. The EM signal couples into an additional antenna connected to one of the power network and the ground network. The temporal change to the observed waveform is measured during a time window defined by the test waveform. Modulating the test waveform generates jitter in the observed waveform. Modulating the test waveform generates a glitch in the observed waveform.

In another embodiment, a method for jitter applied detection for a semiconductor secure element comprises generating a test pulse. The test pulse is modulated with an inductive loop coupled to a secure element to generate an observed pulse, wherein the inductive loop is configured to asymmetrically couple an Electromagnetic (EM) signal into a power network and a ground network to alter a timing of a signal of the secure element, the secure element comprising a sampling device. A temporal change between the test pulse and the observed pulse is measured and the temporal change is compared to a reference to determine an Electromagnetic-Fault-Injection (EMFI) event.

Alternative embodiments of the method for jitter applied detection for a semiconductor secure element include one of the following features, or any combination thereof. Measuring the temporal change comprises measuring a difference between a test width of the test pulse and an observed width of the observed pulse to determine a jitter value, wherein the reference defines a jitter value threshold and a jitter value exceeding the jitter value threshold determines that an EMFI event has occurred. Measuring the temporal change comprises sequentially measuring an observed width of the observed pulse and comparing the observed width to the reference, wherein the reference defines a pulse width range, wherein the observed width being outside of the pulse width range determines that an EMFI event has occurred. The observed pulse comprises a glitch and an observed width of the observed pulse is measured between one edge of the observed pulse and the glitch. The temporal change is measured during a time window defined by each edge of the test pulse. The observed pulse is one of a plurality of observed pulses, each of the plurality of observed pulses is generated from a respective secure element, the plurality of observed pulses are multiplexed to generate an interlaced waveform and the temporal change for each respective observed pulse of the interlaced waveform is generated.

In another embodiment, an apparatus comprises a pulse generator configured to generate a test waveform comprising a test pulse. An inductive loop is coupled to a secure element and to an Electromagnetic (EM) signal, the secure element configured to generate an observed waveform comprising an observed pulse. A jitter measurement circuit is configured to receive the test waveform and the observed waveform and to determine a jitter value from a difference between a test width of the test pulse and an observed width of the observed pulse. A comparator circuit is configured to compare the jitter value to a reference to determine an occurrence of an Electromagnetic-Fault-Injection (EMFI) event.

Alternative embodiments of the apparatus include one of the following features, or any combination thereof. The jitter measurement circuit determines the jitter value during a time range defined by the test waveform. The secure element comprises a flip-flop. The inductive loop is configured to asymmetrically couple an Electromagnetic (EM) signal into a power network and a ground network to alter a timing of a signal of the secure element. The inductive loop comprises an additional antenna connected to one of a power network and a ground network. The observed pulse is one of a plurality of observed pulses, each of the plurality of observed pulses is generated from a respective secure element, the plurality of observed pulses are multiplexed to generate an interlaced waveform and a temporal change for each respective observed pulse of the interlaced waveform is generated. A digital filter is coupled to the comparator circuit, wherein the determination of the EMFI event is based on an output of the digital filter.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

We claim:

1. A method for jitter applied detection for a semiconductor secure element comprising:
  - generating a test waveform comprising a test pulse;
  - modulating the test waveform with an inductive loop coupled to a secure element and to an Electromagnetic (EM) signal to generate an observed waveform comprising an observed pulse, wherein the secure element comprises a flip-flop; and
  - measuring a temporal change between the test pulse and the observed pulse and comparing the temporal change to a reference to determine an Electromagnetic-Fault-Injection (EMFI) event.

2. The method of claim 1 wherein modulating with the inductive loop comprises altering a timing of a signal of the secure element and wherein the inductive loop comprises at least one of a power network and a ground network.

3. The method of claim 2 wherein the EM signal couples into the power network by a different amount than into the ground network.

4. The method of claim 1 further comprising coupling the EM signal into an additional antenna connected to one of the power network and the ground network.

5. The method of claim 1 wherein the temporal change to the observed waveform is measured during a time window defined by the test waveform.

6. The method of claim 1 wherein modulating the test waveform generates jitter in the observed waveform.

7. The method of claim 1 wherein modulating the test waveform generates a glitch in the observed waveform.

8. A method for jitter applied detection for a semiconductor secure element comprising:
  - generating a test pulse;
  - modulating the test pulse with an inductive loop coupled to a secure element to generate an observed pulse, wherein the inductive loop is configured to asymmetrically couple an Electromagnetic (EM) signal into a power network and a ground network to alter a timing of a signal of the secure element, the secure element comprising a sampling device; and
  - measuring a temporal change between the test pulse and the observed pulse and comparing the temporal change to a reference to determine an Electromagnetic-Fault-Injection (EMFI) event.

9. The method of claim 8 wherein measuring the temporal change comprises measuring a difference between a test width of the test pulse and an observed width of the observed pulse to determine a jitter value, wherein the reference defines a jitter value threshold and a jitter value exceeding the jitter value threshold determines that an EMFI event has occurred.

10. The method of claim 8 wherein measuring the temporal change comprises sequentially measuring an observed width of the observed pulse and comparing the observed width to the reference, wherein the reference defines a pulse width range, wherein the observed width being outside of the pulse width range determines that an EMFI event has occurred.

11. The method of claim 8 wherein the observed pulse comprises a glitch and an observed width of the observed pulse is measured between one edge of the observed pulse and the glitch.

12. The method of claim 8 wherein the temporal change is measured during a time window defined by each edge of the test pulse.

13. The method of claim 8 wherein the observed pulse is one of a plurality of observed pulses, each of the plurality of observed pulses is generated from a respective secure element, the plurality of observed pulses are multiplexed to generate an interlaced waveform and the temporal change for each respective observed pulse of the interlaced waveform is generated.

14. An apparatus comprising:

a pulse generator configured to generate a test waveform comprising a test pulse;

an inductive loop coupled to a secure element and to an Electromagnetic (EM) signal, the secure element configured to generate an observed waveform comprising an observed pulse;

a jitter measurement circuit configured to receive the test waveform and the observed waveform and to determine a jitter value from a difference between a test width of the test pulse and an observed width of the observed pulse; and a comparator circuit configured to compare the jitter value to a reference to determine an occurrence of an Electromagnetic-Fault-Injection (EMFI) event.

15. The apparatus of claim 14 wherein the jitter measurement circuit determines the jitter value during a time range defined by the test waveform.

16. The apparatus of claim 14 wherein the secure element comprises a flip-flop.

17. The apparatus of claim 14 wherein the inductive loop is configured to asymmetrically couple an Electromagnetic (EM) signal into a power network and a ground network to alter a timing of a signal of the secure element.

18. The apparatus of claim 14 wherein the inductive loop comprises an additional antenna connected to one of a power network and a ground network.

19. The apparatus of claim 14 wherein the observed pulse is one of a plurality of observed pulses, each of the plurality of observed pulses is generated from a respective secure element, the plurality of observed pulses are multiplexed to generate an interlaced waveform and a temporal change for each respective observed pulse of the interlaced waveform is generated.

20. The apparatus of claim 14 further comprising a digital filter is coupled to the comparator circuit, wherein the determination of the EMFI event is based on an output of the digital filter.

* * * * *